United States Patent [19]
Crafton

[11] Patent Number: 5,256,313
[45] Date of Patent: Oct. 26, 1993

[54] SYSTEM AND PROCESS FOR TREATMENT OF CYANIDE-CONTAINING WASTE

[75] Inventor: Michael J. Crafton, Columbus, Ind.

[73] Assignee: Heritage Environmental Services, Inc., Indianapolis, Ind.

[21] Appl. No.: 993,425

[22] Filed: Dec. 21, 1992

[51] Int. Cl.$^5$ .............................. B01D 35/18
[52] U.S. Cl. ................... 210/774; 210/175; 210/178; 210/179; 210/181; 210/904; 210/149; 210/134; 165/66
[58] Field of Search ............. 210/774, 175, 181, 904, 210/805, 319, 178, 179, 97, 98, 149, 134; 165/30, 66

[56] References Cited

U.S. PATENT DOCUMENTS

| | | | |
|---|---|---|---|
| 2,773,025 | 12/1956 | Ricks et al. | 204/149 |
| 3,933,606 | 1/1976 | Harms | 204/152 |
| 3,945,919 | 3/1976 | Schindewolf | . |
| 3,987,094 | 10/1976 | White | 260/515 R |
| 4,042,502 | 8/1977 | Schmidt et al. | . |
| 4,071,448 | 1/1978 | Watanabe et al. | 210/758 |
| 4,105,469 | 8/1978 | Megy et al. | 134/3 |
| 4,294,706 | 10/1983 | Kakihara et al. | 210/903 |
| 4,330,342 | 5/1982 | Fennemann et al. | 134/13 |
| 4,402,837 | 9/1983 | Okugawa | 210/766 |
| 4,610,298 | 9/1986 | Van Schagen et al. | 165/66 |
| 4,670,162 | 6/1987 | Robey | 210/761 |
| 4,729,424 | 3/1988 | Mizuno et al. | 165/30 |
| 4,737,289 | 4/1988 | Castaldi et al. | 210/611 |
| 4,790,940 | 12/1988 | Castaldi et al. | 210/611 |
| 4,802,995 | 2/1989 | Dvorscek et al. | 210/761 |
| 4,877,519 | 10/1989 | Robey | 210/86 |
| 5,106,508 | 4/1992 | Schwitzgebel | 210/712 |

Primary Examiner—Robert A. Dawson
Assistant Examiner—Ana M. Fortuna
Attorney, Agent, or Firm—Barnes & Thornburg

[57] ABSTRACT

A system and process are provided for treatment of cyanide-containing waste to form a substantially detoxified reaction product. The system comprises a reaction vessel, a heat exchange conduit extending through the reaction vessel to provide a flow path for heat exchange fluid, a heating loop for circulating heat exchange fluid through the heat exchange conduit at a temperature sufficient to initiate hydrolysis of cyanides in cyanide-containing waste to form the substantially detoxified reaction product, a cooling loop for circulating heat exchange fluid through the heat exchange conduit at a temperature sufficient to cool the substantially detoxified reaction product to a discharge temperature, and an apparatus for diverting flow of heat exchange fluid from the heating loop to the cooling loop.

16 Claims, 1 Drawing Sheet

SYSTEM AND PROCESS FOR TREATMENT OF CYANIDE-CONTAINING WASTE

BACKGROUND AND SUMMARY OF THE INVENTION

The present invention relates to a waste treatment system, and more particularly to a waste treatment system configured for treatment of cyanide-containing waste by high temperature hydrolysis.

A wide variety of industrial operations, such as steel manufacturing, plating operations, petrochemical operations, and aluminum smelting, use cyanides and/or create cyanides. Liquid and solid wastes from these operations may well be contaminated with alkali metal cyanides, silver cyanides, or cyanides in a wide variety of other forms. Where the wastes have been improperly stored at a hazardous waste dump, it is also possible that the soil at the dump site will become contaminated with cyanides. As a result, it has become necessary to develop processes capable of treating waste liquids, waste sludges, and slurries made from contaminated soil to remove or destroy substantial portions of the cyanide contaminants.

A number of researchers have focused on the use of chemical oxidation to detoxify cyanide-containing wastes. For example, alkaline chlorination has been used. However, this process may not be effective to destroy some complex cyanides. Sulfur dioxide in the presence of air and a copper catalyst has also been used to oxidize cyanides.

It has been reported that cyanides can be hydrolyzed to form ammonia and formic acid, both of which can readily be disposed of in an environmentally sound manner. See, for example, U.S. Pat. No. 4,042,502. The hydrolysis reaction is as follows:

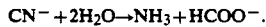

$$CN^- + 2H_2O \rightarrow NH_3 + HCOO^-.$$

In order for this reaction to take place at rates sufficient for industrial purposes, it is necessary to subject the cyanide-containing waste to both high temperatures and pressures. Temperatures of 120°–200° C. (248°–392° F.) are commonly employed, along with pressures from about 5 to about 100 atm.

Catalysts, while not essential, have also been used. For example, U.S. Pat. No. 3,945,919 discloses the use of various transition metal catalysts in conversion of cyanide-containing waste by hydrolysis.

One major problem with designing systems to carry out cyanide hydrolysis on an industrial scale is that the hydrolysis reaction results in the formation of solids which tend to aggregate in the system as the reaction progresses. The solids can clog pipes and hamper valve operation, but perhaps more importantly can collect on heat transfer surfaces, significantly impairing heat transfer and thus limiting system efficiency.

One attempt to deal with the clogging problem in cyanide hydrolysis systems is disclosed in U.S. Pat. No. 4,877,519. There, a first double pipe heat exchanger is provided for an influent waste stream to a hydrolysis reactor and a second double pipe heat exchanger is provided for an effluent stream from the reactor. The influent and effluent streams pass through the tube side of the first and second heat exchangers, an arrangement which is said to minimize clogging of the heat exchangers. The reactor is designed to provide intermittent discharge of effluent for brief intervals, which is also said to avoid solids build-up in the system.

However, even in systems of this type, the influent and effluent waste streams must flow through a piping network, and clogging may occur. In addition, because the waste influent is preheated in a first heat exchanger, solids deposition may actually begin to occur in the first heat exchanger, and the heat exchange surfaces may become fouled. It would be desirable to provide a system for cyanide destruction by high temperature hydrolysis in which the potential for system problems due to solids build-up is minimized by avoiding the need to flow the cyanide-contaminated waste influent and the substantially detoxified waste effluent through an extensive network of piping and valves. It would also be desirable to provide a system in which the cyanide-containing waste is heated to a temperature sufficient to provide hydrolysis and is thereafter cooled to a safe discharge temperature in a single vessel without preheating the cyanide-containing waste influent.

According to the present invention, a system is provided for treatment of cyanide-containing waste to form a substantially detoxified reaction product. The system comprises a reaction vessel, a heat exchange conduit extending through the reaction vessel, a heating loop and a cooling loop both serving the heat exchange conduit, and means for selectively diverting the flow of heat exchange fluid between the heating loop and the cooling loop. The heat exchange conduit includes an inlet and an outlet. The heating loop includes a heating vessel, a heating loop delivery conduit extending between the heating vessel and the inlet, and a heating loop recycle conduit extending between the outlet and the heating vessel, a cooling loop, a cooling loop delivery conduit extending from the cooling apparatus to the inlet, and a cooling loop recycle conduit extending from the outlet to the cooling apparatus. The diverting means diverts the flow of heat exchange fluid at the outlet between the heating loop recycle conduit and the cooling loop inlet conduit. Thus, heat exchange fluid flows between the heating loop and the heat exchange conduit for a time sufficient to convert the cyanide-containing waste in the reaction vessel into the substantially detoxified reaction product. Thereafter, the heat exchange fluid flows between the cooling loop and the heat exchange conduit for a time sufficient to cool the substantially detoxified reaction product to a safe discharge temperature.

The invention further comprises a process for treating cyanide-containing waste to form a substantially detoxified reaction product in a reaction vessel having a heat exchange conduit extending therethrough. The process comprises the steps of loading the cyanide-containing waste into the reaction vessel, heating heat exchange fluid in a heating vessel to a temperature sufficient to initiate hydrolysis of cyanide in the cyanide-containing waste, circulating the hot heat exchange fluid between the heating vessel and the heat exchange conduit for a time sufficient to convert the cyanide-containing waste to the substantially detoxified reaction product, diverting the flow of heat exchange fluid from the heating vessel to a cooling apparatus, cooling the heat exchange fluid to a predetermined temperature by passage through the cooling apparatus, and circulating the cool heat exchange fluid between the cooling apparatus and the heat exchange conduit for a time sufficient to cool the substantially detoxified reaction product to a discharge temperature.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which.

DETAILED DESCRIPTION OF THE INVENTION

A system and process in accordance with the present invention allows for the destruction of cyanide-containing waste by high temperature hydrolysis without solids build-up in flow passageways. In the present invention, the cyanide-containing waste is heated to a temperature sufficient to provide hydrolysis, and is thereafter cooled to a safe discharge temperature, in the same reaction vessel. Thus, the present invention eliminates the need for cyanide-containing waste influent and substantially detoxified waste effluent to flow through an extensive network of piping.

Figure 1:
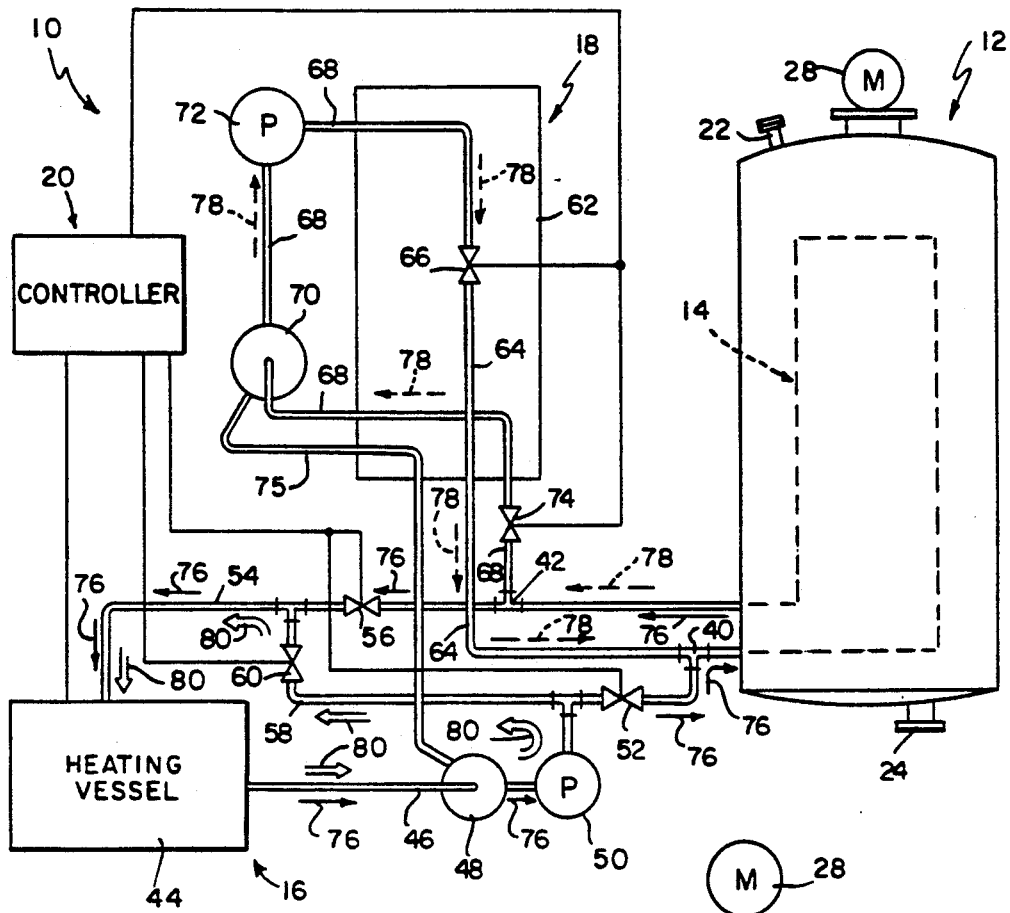
FIG. 1 is a diagrammatic view of a system in accordance with the present invention illustrating the flow of heat exchange fluid through the heating loop and the cooling loop.

One preferred embodiment of a system in accordance with the present invention is illustrated in FIG. 1. As shown, a system 10 includes a reaction vessel 12, a heat exchange conduit 14 extending through reaction vessel 12, a heating loop 16 and a cooling loop 18 both serving heat exchange conduit 14, and a controller 20 providing means for selectively diverting flow of heat exchange fluid between heating loop 16 and cooling loop 18.

Figure 2:
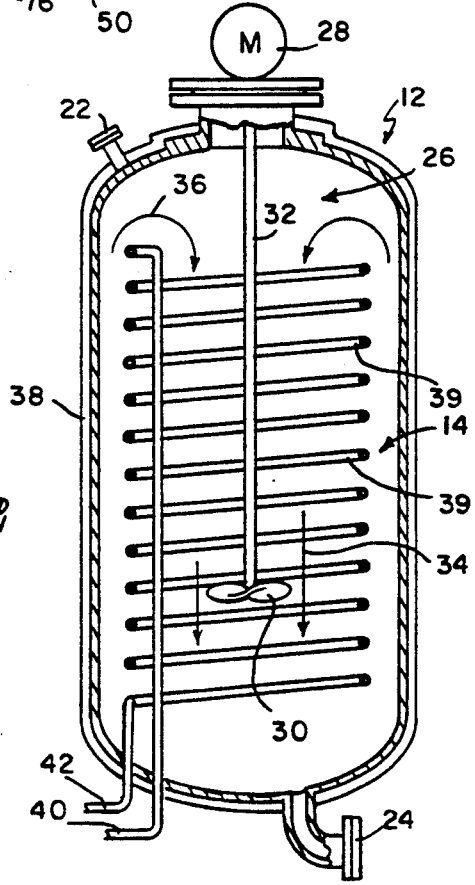
FIG. 2 is a sectional view of a reaction vessel showing a coiled heat exchange conduit extending therethrough.

Reaction vessel 12 is shown in more detail in FIG. 2. Reaction vessel 12 is preferably an agitated tank, although other commercially available reactors commonly used for treating slurries as sludges may also be used in accordance with the present invention. Vessel 12 typically has a volume of about 1500 gallons, although this is not critical. Vessel 12 also includes standard safety features including at least one pressure relief port (not shown) which may vent into a collection device for treating any escaped vapors in an environmentally sound manner. Reaction vessel 12 is formed to include an entry port 22 configured to receive cyanide-containing waste for treatment. Reaction vessel 12 is also formed to include an exit port 24 configured to allow discharge of the substantially detoxified reaction product. Vessel 12 is provided with a standard agitator 26 including a motor 28 and an agitator blade 30 positioned on a vertical shaft 32. Preferably, agitator 26 is configured for rotation such that the contents of vessel 12 are moved downward along a central longitudinal axis of vessel 12 as indicated by arrows 34 and upward along the walls of vessel 12 before returning to the central region of vessel 12 as indicated by arrows 36. Alternatively, a horizontally disposed reaction vessel and agitator may be used. Motor 28 may be any of a wide variety of commercially available electric or other motors. Optionally, vessel 12 also includes a heating jacket 38 configured to receive heat exchange fluid from heating loop 16 through a standard piping network (not shown).

Heat exchange conduit 14 extends through reaction vessel 12 to provide a flow path for heat exchange fluid, allowing the heat exchange fluid to exchange heat indirectly through the walls of conduit 14 with the contents of reaction vessel 12 during both the heating and cooling cycles. Heat exchange conduit 14 includes a plurality of coils 39. Conduit 14 includes an inlet 40 for feeding heat exchange fluid to the top of the plurality of coils 39 and an outlet 42 for discharging heat exchange fluid from the bottom of coils 39. Coils 39 are positioned near the wall of reaction vessel 12 and extend symmetrically about the longitudinal axis of vessel 12. The bank of coils 39 is attached to vessel 12 by way of U-bolts or the like. The number of coils will vary with the application, but about twelve turns is typical.

Advantageously, heat exchange conduit 14 and reaction vessel 12 provide for relatively rapid and uniform heat transfer. The orientation of coils 39, together with the use of agitation, provides uniform distribution of heat throughout the interior of vessel 12, avoiding the incidence of hot spots.

The heat exchange fluid most preferably used for circulation through heat exchange conduit 14 and hence for heat exchange with the contents of reaction vessel 12 is a high temperature heating oil which is stable under nitrogen gas to a temperature of at least 343° C. (650° F.). The preferred heat exchange fluid is a commercially available high temperature heating oil known as CaLFLO HTF. Alternatively, other high temperature heating oils may be used, such as Syntrel 350 or Marlotherm +S.

Returning to FIG. 1, heating loop 16 is configured to circulate heat exchange fluid through heat exchange conduit 14 at a temperature sufficient to initiate hydrolysis of cyanides in the cyanide-containing waste contained in vessel 12. The heating loop 16 includes a heating vessel 44 for heating heat exchange fluid. Heating vessel 44 is preferably a standard insulated tank having an electrical heater, although other types of heaters, including direct fired may also be used. Of course, when the system of the present invention is operated in at or near other processing facilities, it is possible that other sources of heat may be available to heat the heat exchange fluid for using in heating loop 16.

Heating loop 16 also includes a heating loop delivery conduit 46 for heat exchange fluid extending from heating vessel 44 to inlet 40 by which high temperature heat exchange fluid passes from heating vessel 44 to heat exchange conduit 14. A heating loop expansion tank 48 is positioned in delivery conduit 46. A heating loop pump 50 is positioned in delivery conduit 46 downstream of expansion tank 48. In addition, an automated valve 52 is positioned between pump 50 and inlet 40. Automated valve 52 is connected to controller 20 and assists in diverting flow between heating loop 16 and cooling loop 18 as will be subsequently described. Heating loop 16 further includes a heating loop recycle conduit 54 extending between outlet 42 and heating vessel 44. Heat exchange fluid exiting heat exchange conduit 14 at outlet 44 passes through recycle conduit 54 to return to heating vessel 44 for reheating. An automated valve 56 is positioned in recycle conduit 54 and, like automated valve 52, is controlled by controller 20. Heating loop 16 thus provides first means for circulating heat exchange fluid through heat exchange conduit 14 at a temperature sufficient to initiate hydrolysis of cyanides in the cyanide-containing waste to form the substantially detoxified reaction product.

Heating loop 16 further includes an internal recycle conduit 58. Internal recycle conduit 58 branches from heating loop delivery conduit 46 at a point downstream of pump 50 and upstream of automated valve 52. Conduit 58 enters heating loop recycle conduit 54 at a point downstream of automated valve 56. An automated valve 60 is positioned in internal recycle conduit 58 and is controlled by controller 20. As will be described subsequently in greater detail, when controller 20 operates to close valves 52 and 56 and to open valve 60 in internal recycle conduit 58, heat exchange fluid flowing in heating loop 16 is prevented from entering heat exchange conduit 14, and must pass through conduit 58 and return to heating vessel 44. This internal recirculation of heat exchange fluid through heating vessel 44 advantageously occurs when the main flow of heat exchange fluid in system 10 is through cooling loop 18. By recirculating heat exchange fluid using internal recycle conduit 58 during the cooling phase, the temperature of the heat exchange fluid flowing in heating loop 16 is kept relatively uniform. Hot spots which might otherwise form if heat exchange fluid in heating vessel 44 is kept stagnant are avoided.

Cooling loop 18 is configured to circulate heat exchange fluid through heat exchange conduit 14 after completion of the heating stage to cool the substantially detoxified reaction product to a safe discharge temperature. As used in reference to the present invention, the safe "discharge temperature" for the substantially detoxified reaction product is lower than about 100° C. (212° F.). Generally, the temperature of the substantially detoxified product should be cool enough to allow exit port 24 to be opened without inducing evaporation.

Cooling loop 18 includes a cooling apparatus 62 which is preferably an air-cooled heat exchange apparatus. Most preferably, cooling apparatus 62 is a fin-fan cooler. A fin-fan cooler is typically comprised of steel tubing on to which aluminum fins have been added to improve heat transfer. Banks of this tubing are then mounted above large fans to further improve the heat transfer between the heat exchange fluid and the air.

Cooling loop 18 also includes a cooling loop delivery conduit 64 extending through cooling apparatus 62 to inlet 40 to deliver cooled heat exchange fluid from cooling apparatus 62 to heat exchange conduit 14 for heat exchange with the substantially detoxified reaction products in vessel 12. An automated valve 66 controlled by controller 20 is positioned to control flow through cooling loop delivery conduit 64.

Cooling loop 18 further includes a cooling loop recycle conduit 68 extending from outlet 42 to eventually join cooling loop delivery conduit 66 within cooling apparatus 62. An expansion tank 70 is positioned in recycle conduit 68 upstream of the point where conduit 68 enters cooling apparatus 62 and joins with delivery conduit 64. As shown, recycled conduit 68 makes a pass through cooling apparatus 62 upstream of expansion tank 70. A cooling loop pump 72 is positioned downstream of expansion tank 70 to pump heat exchange fluid received from expansion tank 70 through cooling apparatus 62. An automated valve 74 controlled by controller 20 is positioned in cooling loop recycle conduit 68 upstream of expansion tank 70. Cooling loop 18 thus provides second means for circulating heat exchange fluid through heat exchange conduit 14.

An optional make-up line 75 extends between expansion tank 48 and expansion tank 70. Flow in make-up line 75 may be manually controlled or may be controlled by a valve (not shown) connected to controller 20 or other process controllers to allow relatively limited flow of make-up heat exchange fluid from tank 48 to tank 70 while heat exchange fluid is circulating in cooling loop 18.

As noted, controller 20 controls the operation of automated valves 52, 56, 60, 66 and 74. Controller 20 may be any of a variety of commercially available process control instruments, such as a G.E. Programmable Logic Controller with a standard control console unit. Controller 20, through selectively opening and closing valves 52, 56, 60, 66 and 74, serves as means for diverting the flow of heat exchange fluid at outlet 42 between heating loop recycle conduit 54 and cooling loop recycle conduit 68. Controller 20 operates to allow heat exchange fluid to flow between heating loop 16 and heat exchange conduit 14 for a time period sufficient to convert cyanide-containing waste in reaction vessel 12 to substantially detoxified reaction product. Controller 20 then adjusts the position of the controlled valves to divert flow of heat exchange fluid at outlet 42 to cooling loop 18—specifically, to cooling loop recycle conduit 68. The controlled valves remain in this position, allowing heat exchange fluid to circulate in cooling loop 18 for a time sufficient to cool the substantially detoxified reaction product in reaction vessel 12 to the discharge temperature. As previously noted, in this cooling phase, controller 20 maintains valve 60 in an open position to allow heat exchange fluid remaining in heating loop 16 to be pumped continuously through heating vessel 44.

In operation of system 10 for treating cyanide-containing waste to form a substantially detoxified reaction product in a reaction vessel 12, the cyanide-containing waste is first loaded directly into reaction vessel 12 through entry port 22. If the cyanide-containing waste is in the form of contaminated soils or other solids, the waste is generally worked into a sludge or slurry before being loaded into reaction vessel 12.

Heat exchange fluid is then heated in the heating vessel 44 to a temperature sufficient to initiate hydrolysis of cyanides in the cyanide-containing waste. Temperatures of the heat exchange fluid in heating loop delivery conduit 46 are typically about 300° C. (572° F.). The temperature necessary to initiate hydrolysis of the cyanide-containing waste in reaction vessel 12 is between 204°-260° C. (400°-500° F.) when reaction vessel 12 is operated at an operating pressure of approximately 34 atm.

Next, the heat exchange fluid is circulated between heating vessel 44 and heat exchange conduit 14 (i.e., the heat exchange fluid is circulated in heating loop 16) for a time sufficient to convert the cyanide-containing waste to the substantially detoxified reaction product. Flow of the heat exchange fluid as it circulates in heating loop 16 is indicated by solid arrows 76 in FIG. 1. Typically, about 1–2 hours of heat exchange is sufficient to heat the cyanide-containing waste to a temperature of 204°-260° C. (400°-500° F.) at about 34 atm., conditions under which hydrolysis will commence. An additional 1 to 4 hours of heat exchange is needed for completion of the hydrolysis reaction, depending upon the volume of cyanide-waste being treated and the stability of the particular cyanide complexes contained in the waste.

As the reaction progresses, the contents of reaction vessel 12 (comprising cyanide-containing waste and some reaction product) are agitated using agitator 26. Advantageously, agitation reduces the potential for scaling on the outside surface of coils 39, and also enhances heat transfer throughout reaction vessel 12.

During the heating phase, controller 20 operates to open valves 52 and 56 while closing valves 60, 66, and 74. Thus, heat exchange fluid exiting heat exchange conduit at outlet 42 cannot pass through cooling loop recycle conduit 68, but rather must flow through heating loop recycle conduit 54. Similarly, because valve 60 is closed, heat exchange fluid passing through pump 50 in heating loop delivery conduit 46 cannot flow through internal recycle conduit 58 to reach heating loop recycle conduit 54, but rather must flow to inlet 40 and hence to heat exchange conduit 14 to exchange heat with the cyanide-containing waste in reaction vessel 12.

After heat exchange fluid has been circulated in heating loop 16 for a time period sufficient to convert the cyanide-containing waste to substantially detoxified reaction product, controller 20 operates to reset the positions of the controlled valves to divert flow of heat exchange fluid to cooling loop 18. Specifically, valves 60, 66, and 74 are opened, while valves 52 and 56 are closed. Because valve 74 is open, heat exchange fluid at outlet 42 can flow through cooling loop recycle conduit 68, making an initial pass through cooling apparatus 62 as indicated by dotted arrows 78. Because valve 66 is also open, heat exchange fluid can also make a subsequent pass through cooling apparatus 62 in cooling loop delivery conduit 64, eventually reaching inlet 40. Heat exchange fluid is circulated in cooling loop 18 in this fashion for a time period sufficient to cool the substantially detoxified reaction product to a safe discharge temperature—i.e., lower than about 100° C. (212° F.).

The time for sufficient cooling of the substantially detoxified reaction product is from 2-3 hours. Therefore, the total residence time for the conversion of cyanide-containing waste in reaction vessel 12 to cooled, substantially detoxified reaction product ranges from about 5-12 hours.

As noted, valve 60 is also opened during the cooling phase. Thus, heat exchange fluid exiting heating vessel 44 and flowing in delivery conduit 46 can pass through internal recycle conduit 58 as illustrated by open flow arrows 80 to reach heating loop recycle conduit 54, eventually returning to heating vessel 44. This results in the step of recycling a portion of hot heat exchange fluid to the heating vessel 44 while cool heat exchange fluid is circulated between the cooling apparatus 62 and the heat exchange conduit 14. Flow rates of 300 gpm are typical for internal recycling. As noted, the advantage of internal recycling is to minimize hot spots in the heat exchange fluid while maintaining the heat exchange fluid remaining in heating loop 16 at relatively high temperature for use in exchanging heat with a subsequent batch of cyanide-containing waste.

Advantageously, then, the heat exchange fluid used to heat the cyanide-containing waste to hydrolyze the waste is also used to cool the substantially detoxified reaction product to the safe discharge temperature. The cyanide-containing waste remains in reaction vessel 12 throughout the process, eliminating the need to flow waste or reaction product through a piping network where both clogging and scaling may occur.

Although the invention has been described in detail with reference to certain preferred embodiments, variations and modifications exist within the scope and spirit of the invention as described and defined in the following claims.

I claim:

1. A system for treatment of cyanide-containing waste to form a substantially detoxified reaction product, the system comprising
   a reaction vessel formed to include an entry port configured to receive cyanide-containing waste and an exit port configured to allow discharge of the substantially detoxified reaction product,
   a heat exchange conduit within the reaction vessel to provide a flow path for heat exchange fluid, the heat exchange conduit including an inlet and an outlet,
   a heating loop configured to circulate heat exchange fluid through the heat exchange conduit at a temperature sufficient to initiate hydrolysis of cyanides in the cyanide-containing waste, the heating loop including a heating vessel for heating the heat exchange fluid, a heating loop delivery conduit for heat exchange fluid extending between the heating vessel and the inlet of said heat exchange conduit, and a heating loop recycle conduit for heat exchange fluid extending between the outlet of said heat exchange conduit and the heating vessel,
   a cooling loop configured to circulate heat exchange fluid through the heat exchange conduit at a temperature sufficient to cool the detoxified reaction product to a discharge temperature, the cooling loop including a cooling apparatus for cooling the heat exchange fluid, a cooling loop delivery conduit extending from the cooling apparatus to the inlet of said heat exchange conduit, and a cooling loop recycle conduit extending from the outlet of said heat exchange conduit to the cooling apparatus, and
   means for selectively diverting the flow of heat exchange positioned between the heating loop recycle conduit and the cooling loop inlet conduit so that heat exchange fluid flows between the heating loop and the heat exchange conduit for a time sufficient to convert the cyanide-containing waste into the substantially detoxified reaction product and the heat exchange fluid thereafter flows between the cooling loop and the heat exchange conduit for a time sufficient to cool the substantially detoxified reaction product to a discharge temperature.

2. The system of claim 1, wherein the diverting means includes a first automated valve between the outlet and the heating loop recycle conduit, a second automated valve between the outlet and the cooling loop inlet conduit, and control means for placing the first valve in an open position and the second valve in a closed position to divert flow of heat exchange fluid to the heating loop.

3. The system of claim 1, further comprising a heat exchange fluid recycle conduit extending between the heating loop delivery conduit and the heating loop recycle conduit to allow a portion of heat exchange fluid flowing in the heating loop delivery conduit to pass to the heating loop recycle conduit without flowing through the heat exchange conduit.

4. The system of claim 3, further comprising a third automated valve in the heat exchange fluid recycle conduit and second control means for placing the third valve in an open position and the first valve in a closed position so that the portion of heat exchange fluid recycles to the heating vessel while the heat exchange fluid is flowing in the cooling loop.

5. The system of claim 1, wherein the reaction vessel includes an agitated tank and the heat exchange conduit includes a coiled conduit positioned symmetrically with the longitudinal axis of the agitated tank.

6. The system of claim 1, further comprising a heating jacket surrounding the reaction vessel.

7. A process for treating cyanide-containing waste to form a substantially detoxified reaction product in a reaction vessel having a heat exchange conduit extending therethrough, the process comprising the steps of
   (a) loading the cyanide-containing waste into the reaction vessel,
   (b) heating heat exchange fluid in a heating vessel to a temperature sufficient to initiate hydrolysis of cyanides in the cyanide-containing waste,
   (c) circulating the hot heat exchange fluid between the heating vessel and the heat exchange conduit for a time sufficient to convert the cyanide-containing waste to the substantially detoxified reaction product,
   (d) diverting the flow of heat exchange fluid from the heating vessel to a cooling apparatus,
   (e) cooling the heat exchange fluid to a predetermined temperature by passage through the cooling apparatus, and
   (f) circulating the cool heat exchange fluid between the cooling apparatus and the heat exchange conduit for a time sufficient to cool the substantially detoxified reaction product to a discharge temperature.

8. The process of claim 7, further comprising the step of agitating the cyanide-containing waste in the reaction vessel.

9. The process of claim 7, further comprising the step of recycling a portion of hot heat exchange fluid to the heating vessel while cool heat exchange fluid is circulated between the cooling apparatus and the heat exchange conduit.

10. The process of claim 7, wherein the hot heat exchange fluid is circulated between the heating vessel and the heat exchange conduit for about 1 to about 6 hours.

11. A system for treatment of cyanide-containing waste to form a substantially detoxified reaction product, the system comprising
    a reaction vessel formed to include an entry port configured to receive cyanide-containing waste and an exit port configured to allow discharge of the substantially detoxified reaction product,
    a heat exchange conduit within the reaction vessel to provide a flow path for heat exchange fluid, the heat exchange conduit including an inlet and an outlet,
    first means for circulating heat exchange through the heat exchange conduit at a temperature sufficient to initiate hydrolysis of cyanides in the cyanide-containing waste to form the substantially detoxified reaction product, the first circulating means communicating heat exchange fluid to the inlet of said heat exchange conduit and receiving heat exchange fluid from the outlet of said heat exchange conduit,
    second means for circulating heat exchange fluid through the heat exchange conduit at a temperature sufficient to cool the substantially detoxified reaction product to a discharge temperature, the second circulating means communicating heat exchange fluid to the inlet and receiving heat exchange fluid from the outlet of said heat exchange conduit, and
    means for diverting flow of heat exchange fluid at the outlet from the first circulating means to the second circulating means.

12. The system of claim 11, wherein the first circulating means includes a heating vessel and a first recycle conduit extending between the outlet and the heating vessel and the diverting means includes a first automated valve positioned in the recycle conduit.

13. The system of claim 12, wherein the second circulating means includes a cooling apparatus and a second recycle conduit extending between the outlet and the cooling apparatus and the diverting means includes a second automated valve positioned in the second recycle conduit and means for controlling the first and second automated valves so that the first automated valve is open and the second automated valve is closed for a time period sufficient to allow conversion of the cyanide-containing waste to the substantially detoxified reaction product.

14. The system of claim 11, wherein the first circulating means includes a heating vessel and a delivery conduit extending between the heating vessel and the inlet of said heat exchange conduit, the system further comprising a return conduit extending between the delivery conduit and the heating vessel to communicate a portion of the heat exchange fluid in the delivery conduit back to the heating vessel before it flows through the heat exchange conduit.

15. The system of claim 11, wherein the reaction vessel includes an agitated tank and the heat exchange conduit includes a coiled conduit positioned symmetrically about the longitudinal axis of the agitated tank.

16. The system of claim 11, further comprising a heating jacket surrounding the reaction vessel.

* * * * *